(12) United States Patent
Sapronov et al.

(10) Patent No.: US 8,347,038 B2
(45) Date of Patent: Jan. 1, 2013

(54) OPTIMIZING MEMORY COPY ROUTINE SELECTION FOR MESSAGE PASSING IN A MULTICORE ARCHITECTURE

(75) Inventors: Sergey I Sapronov, Sarov (RU); Alexey V. Bayduraev, Sarov (RU); Alexander V. Supalov, Erftstadt (DE); Vladimir D. Truschin, Sarov (RU); Igor Ermolaev, Nizhny Novgorod (RU); Dmitry Mishura, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 12/922,194

(22) PCT Filed: Mar. 31, 2008

(86) PCT No.: PCT/RU2008/000193
§ 371 (c)(1),
(2), (4) Date: Nov. 10, 2010

(87) PCT Pub. No.: WO2009/123492
PCT Pub. Date: Oct. 8, 2009

(65) Prior Publication Data
US 2011/0055487 A1    Mar. 3, 2011

(51) Int. Cl.
*G06F 13/00*    (2006.01)
(52) U.S. Cl. .................. 711/130; 711/149; 711/154

(58) Field of Classification Search .................. 711/130, 711/149, 154
See application file for complete search history.

(56) References Cited

U.S. PATENT DOCUMENTS
2009/0240915 A1*    9/2009    Faraj ............................. 712/28

OTHER PUBLICATIONS

Kamil et al., "Optimization and Evaluation of a Titanium Adaptive Mesh Refinement Code", Berkley, May 19, 2004, pp. 1-11, XP-002514597.
Vaidyanathan et al., "Efficient Asynchronous Memory Copy Operations on Multi-Core Systems and I/OAT", Cluster Computing, 2007 IEEE International Conference on Cluster Computing, Sep. 17, 2007, pp. 159-168, XP-031324089.

* cited by examiner

*Primary Examiner* — Reba I Elmore
(74) *Attorney, Agent, or Firm* — Trop, Pruner & Hu, P.C.

(57) ABSTRACT

In one embodiment, the present invention includes a method to obtain topology information regarding a system including at least one multicore processor, provide the topology information to a plurality of parallel processes, generate a topological map based on the topology information, access the topological map to determine a topological relationship between a sender process and a receiver process, and select a given memory copy routine to pass a message from the sender process to the receiver process based at least in part on the topological relationship. Other embodiments are described and claimed.

19 Claims, 5 Drawing Sheets

OPTIMIZING MEMORY COPY ROUTINE SELECTION FOR MESSAGE PASSING IN A MULTICORE ARCHITECTURE

BACKGROUND

Processes typically communicate through internode or intranode messages. There are many different types of standards that have been formed to attempt to simplify the communication of messages between processes, as message passing serves as an effective programming technique for exploiting coarse-grained concurrency on distributed computers. One such standard is the message passing interface (called "MPI"). MPI: A Message-Passing Interface Standard, Message Passing Interface Forum, May 5, 1994; and MPI-2: Extension to the Message-Passing Interface, Message Passing Interface Forum, Jul. 18, 1997. MPI is essentially a standard library of routines that may be called from programming languages, such as FORTRAN and C. MPI is portable and typically fast due to optimization of the platform on which it is run.

Message passing libraries can be used to provide parallel applications with communication service according to the MPI-2 standard specification. For internode communication the library uses network channels (e.g., Transmission Control Protocol/Internet Protocol (TCP/IP), Infiniband, Myrinet), and for intranode communication it uses a shared memory channel. Communication through the shared memory channel becomes an issue when the cluster node has more than one central processing unit (CPU) or CPU core such as in a multicore architecture.

In multiprocessor architectures that do not share system resources, messaging through shared memory from any process to another is equivalent, give or take the layout of the processors of a multiprocessor package or board. However, for multicore architectures this is not the case. Nevertheless, MPI libraries typically use a single memory copy routine to perform message passing.

DETAILED DESCRIPTION

Embodiments may be used to detect topology information of a system, and more particularly a system including one or more multicore processors. This information can then be used to select the most appropriate copy routine for message passing over a shared memory channel. In this way, a MPI library may increase performance gain and use peak capacity of a multicore architecture.

A shared memory channel in accordance with an embodiment of the present invention can be implemented as a first-in first-out (FIFO) queue. The sender side puts a message into a queue and the receiver gets the message from the queue. Both sides use a memory copy routine to perform the messaging passing. Maximum performance gain is reached when parallel processes are pinned on a core and cannot migrate during the run to another core, preventing ineffective cache and bus utilization.

A typical multicore architecture in accordance with an embodiment of the present invention share cache and front side bus (FSB) resources. Thus there are at least three different cases of messaging from process to process: processes are pinned on cores with a shared cache such as a level two (L2) cache; processes are pinned on cores without shared cache but located in the same physical processor package; and processes are pinned on cores that are not located in the same physical processor package.

Figure 1:
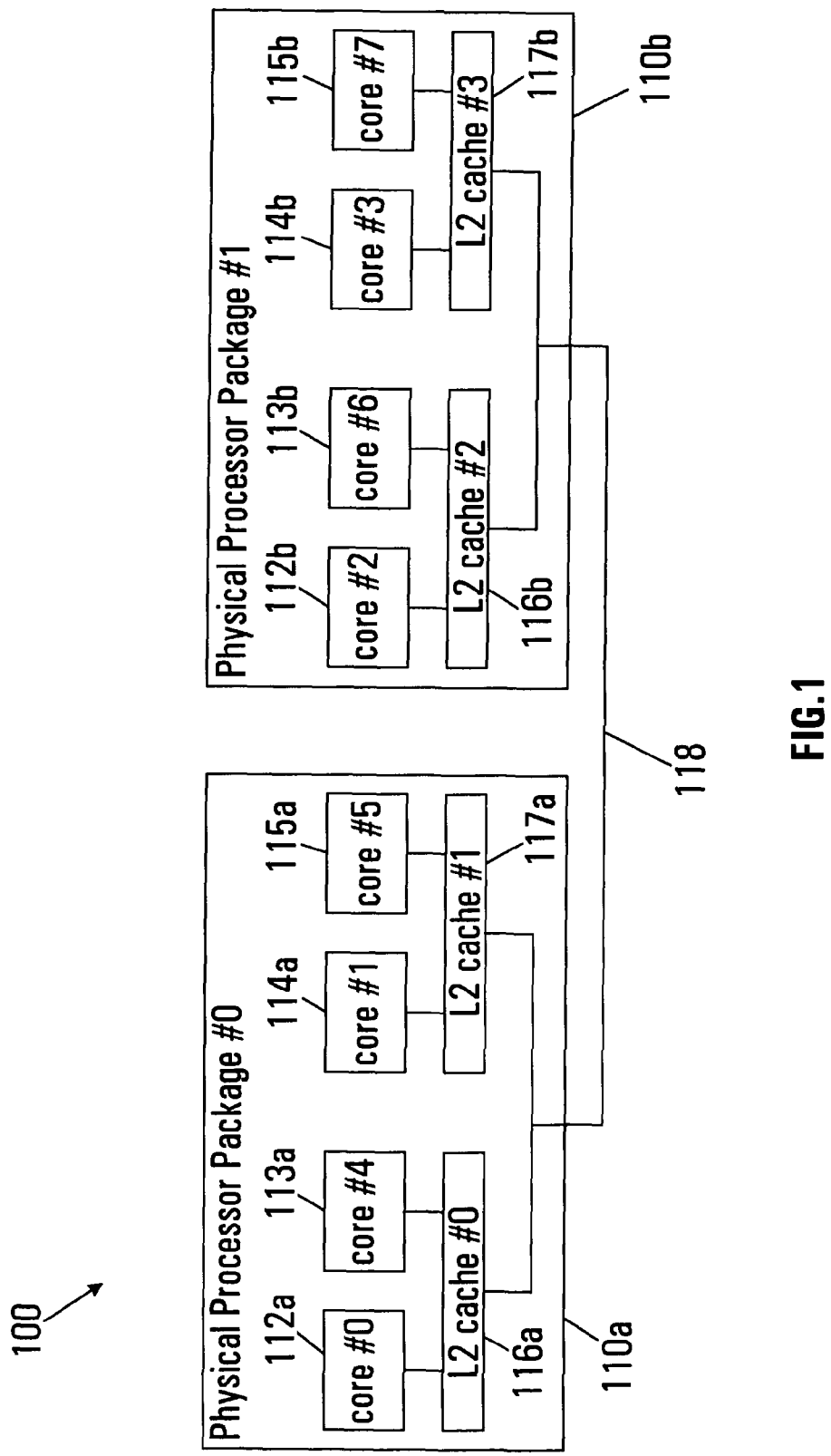
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may be a multiprocessor system including multiple processor packages $110_a$ and $110_b$ (generically processor package 110). These processor packages may also be referred to herein as nodes or sockets. Each processor package may include one or more semiconductor die including various circuitry. As shown in FIG. 1, first processor package 110 includes a plurality of cores $112_a$-$115_a$, while second processor package $110_b$ includes a plurality of cores $112_b$-$115_b$. Each core may include various circuitry such as front end units, pipeline units, functional units and so forth to perform operations on data responsive to various instructions such as micro-operands. While not shown for ease of illustration, each core may include a relatively small cache memory, which may be referred to as a level 0 or level 1 (L0 and L1) cache. As further shown in FIG. 1, each pair of cores may be coupled to a level 2 (L2) cache. Specifically, cores $112_a$ and $113_a$ are coupled to a cache memory $116_a$. In turn, cores $114_a$ and $115_a$ are coupled to a cache memory $117_a$. Similar cache connections are present in second processor package $110_b$.

As shown in FIG. 1, cores $112_a$ and $113_a$ (for example) are located more closely to each other than are cores $114_a$ and $115_a$ (for example). Accordingly, communication between cores $112_a$ and $113_a$ may be more efficient than communication between cores $112_a$ and $115_a$. Also, for core $112_a$ to communicate with core $115_a$, such communication must travel through both cache memories $116_a$ and $117_a$. Furthermore, for inter-node communication between processor package $110_a$ and $110_b$, a bus 118, which may be a front side bus (FSB) may couple the respective processor packages together. While shown with this particular implementation in the embodiment of FIG. 1 for discussion purposes, understand that multi-processor systems may have various topologies in different embodiments.

Figure 2:
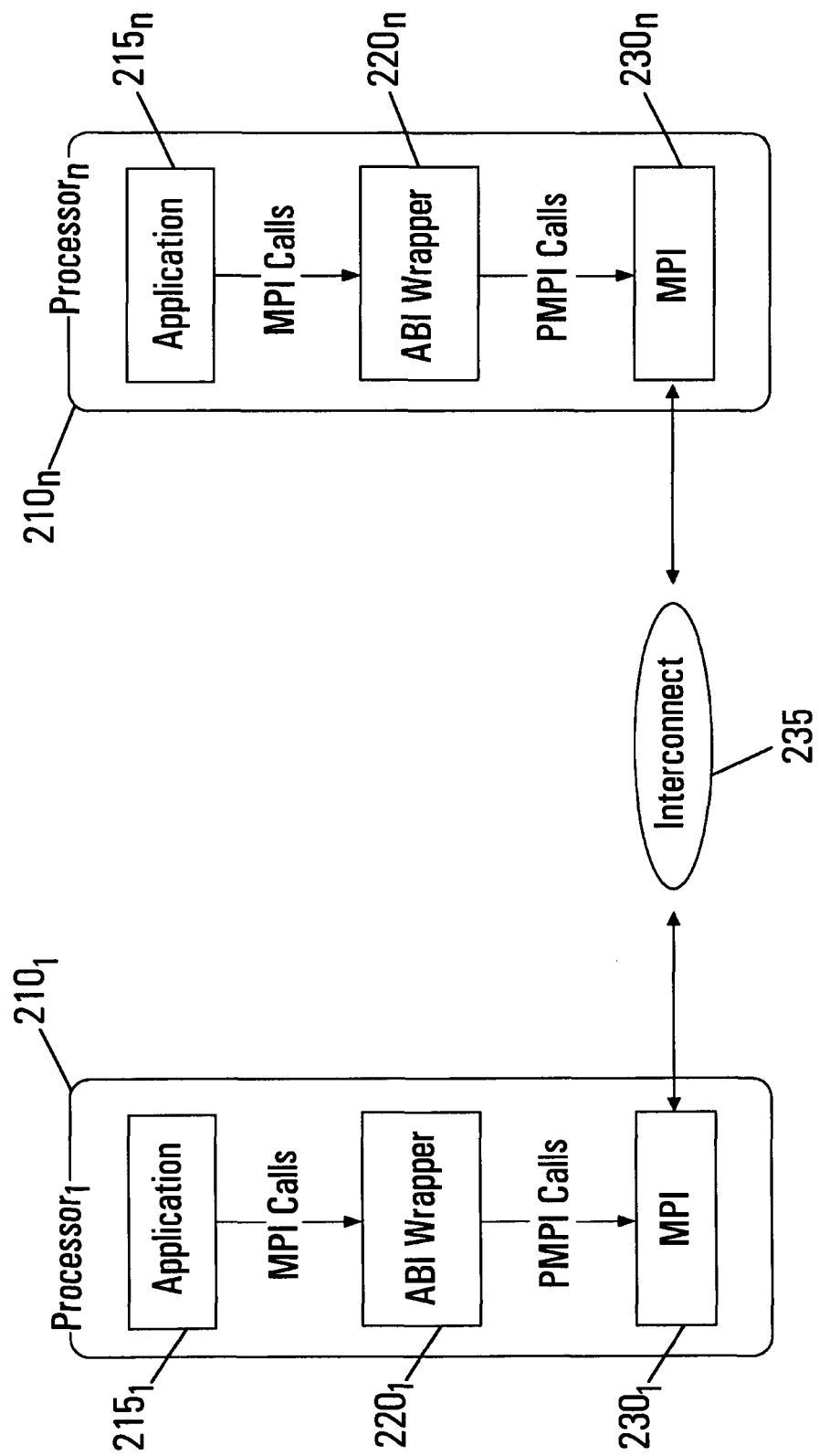
FIG. 2 is a block diagram of the interrelation between multiple processes in accordance with an embodiment of the present invention.

Shown in FIG. 2 is a block diagram of the interrelation between multiple processes in accordance with an embodiment of the present invention. As shown in FIG. 2, a plurality of processors $210_1$-$210_n$ (generically processor 210) are present. Each processor may include a process or application $215_1$-$215_n$ (generically application 215). In some embodiments, the system of FIG. 2 is an exemplary distributed application which is cooperatively implemented via generally contemporaneous execution of machine accessible instructions of multiple processors 210. In particular, a first process (i.e., software application $215_1$) may be executed on first processor $210_1$ and a second process $215_n$, which may be a parallel process, may be executed by second processor $210_n$, which cooperatively realize the example distributed application using any variety of distributed computing algorithms, techniques and/or methods. In the example system of FIG. 2, the example software applications 215 implement different machine accessible instructions. Alternatively, the example software applications may implement similar and/or identical machine accessible instructions.

For simplicity and ease of understanding, the example two processor system of FIG. 2 is referenced. However, distributed applications may be implemented by systems incorporating any number and/or variety of processors. For example, one or more processes of a distributed application may be implemented by a single processor, a single process may be implemented by each processor, etc. Applications 215 may be developed using any variety of programming tools and/or languages and may be used to implement any variety of distributed applications. In the example system of FIG. 2, processors 210 may be implemented within a single computing device, system and/or platform or may be implemented by separate devices, systems and/or platforms. Further, processors 210 may execute any variety of operating system(s).

For purposes of discussion, each application 215 may be written and linked to a MPI implementation different than that of an associated MPI library 230 (generally). To enable easy transition to the corresponding native MPI 230, an application binary interface (ABI) wrapper $220_1$-$220_n$ (generically wrapper 230) written to the same MPI implementation as application 215 may intercept MPI calls made by the process 215 to library $230_1$-$230_n$ (generically library 230) of FIG. 2, which facilitates the exchange of, for example, distributed application messages, between applications 215. ABI wrapper 220 thus calls MPI library 130 using profiling MPI (PMPI) calls. In turn, these MPI libraries 230 may perform requested operations for application 215 which may be transmitted via an interconnect 235 which, in one embodiment may be a fast interconnect such as a point-to-point interconnect, although the scope of the present invention is not limited in this regard.

As described above, multiple message passing cases may be present in a multi-core processor system, each having its own specifics and performance characteristics. For each case different memory copy routines can be beneficial for small messages. As used herein, a small message can be defined with regard to a size of a cache memory of the system, e.g., a L1 or L2 cache, for example. In one embodiment, a small message may be in the range of less than approximately half the size of an L2 cache size, although another embodiment may define a small message to be in a range comparable with the L1 cache size. Note further that the relative size of messages can depend on system architecture or interconnect (channel) speed or properties, among other system properties. For larger messages, it is better to bypass the cache by using so-called non-temporal stores with different cutover points. However, using the same copy routine in each case can lead to ineffective use of the capacity of multicore architecture and a drop in performance.

Embodiments may achieve maximum performance and maximum utilization of workloads on a multicore architecture. In one embodiment, various features of a MPI library may be used to enhance message passing optimization. Specifically, an embodiment may operate as follows. First, each parallel process can be pinned on an individual core using an MPI process pinning feature. This feature is intended to provide desired placement of MPI processes on processors. The main benefit of such placement is that it prevents process and memory migration from one processor to another. Such a feature may also help simplify embodiments of the present invention to avoid each process having to gather topology information about itself and process from other side of a communication before each send/receive call.

Another feature of a MPI library may be used to gather system topology information. For example, in one embodiment, a user-level instruction, e.g., a CPUID machine instruction may be used to obtain certain topology information. This information may include, in one embodiment a number of physical packages (sockets) in the system; a number of cores per physical package; a number of threads (logical processors) per core, and a proximity of the processors/cores through shared resources (caches, sockets). This utility can be called only once at the job start-up stage, and the collected data is passed to each parallel process.

Based on this information, each process can then fill a topological map which contains information about the process pinning and common properties of cores. Table 1 below shows an example of a topological map in accordance with one embodiment of the present invention.

TABLE 1

| Process rank | Core number | L2 cache identifier | Physical package identifier |
|---|---|---|---|
| 0 | 0 | 0 | 0 |
| 1 | 1 | 1 | 0 |
| 2 | 2 | 2 | 1 |
| 3 | 3 | 3 | 1 |
| 4 | 4 | 0 | 0 |
| 5 | 5 | 1 | 0 |
| 6 | 6 | 2 | 1 |
| 7 | 7 | 3 | 1 |

Figure 3:
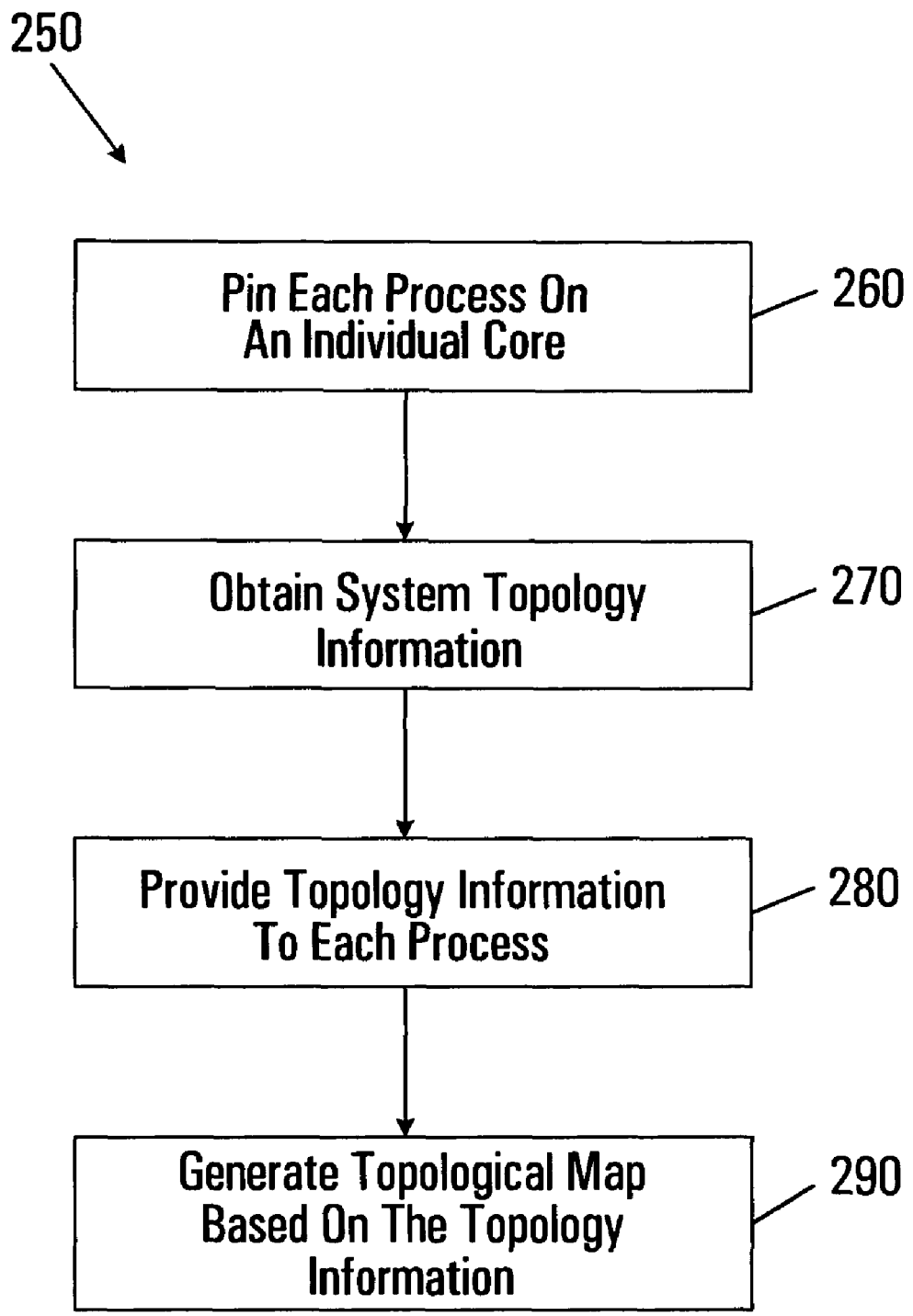
FIG. 3 is a flow diagram of a method in accordance with one embodiment of the present invention.

Thus to initialize a system for optimized message passing in accordance with an embodiment of the present invention, various steps may be taken to set up a topological map and allocate processes to given cores. Referring now to FIG. 3, shown is a flow diagram of a method in accordance with one embodiment of the present invention. As shown in FIG. 3, method 250 may be used to perform such initialization. Specifically, method 250 may begin by pinning each process on an individual core (block 260). As described above, a MPI library feature may be performed to handle this pinning process. At block 270, system topology information may be obtained, e.g., using a user-level instruction. This topology information may be provided to each of multiple processes (block 280). Finally, a topological map may be generated based on the topology information (block 290). In one embodiment, this topological map may be stored in a shared memory, e.g., a dynamic random access memory (DRAM) or other such memory. For example, in some implementations the topological map may be stored in a cache memory that is accessible by the various cores on which the processes execute. While shown with this particular implementation in the embodiment of FIG. 3, the scope of the present invention is not limited in this regard.

Before copying a message, a process determines the rank of the process from the other side of communication, and then finds it in topological table and determines the topological relations by comparing the topological identifiers. When the message is passed to/from the shared memory queue, one of a plurality of memory copy routines may be selected. In one embodiment, the following optimal memory copy routines can be the set for selection depending on the topological relations and message size.

A first memory copy routine may be a cache bypass routine, which uses single instruction multiple data (SIMD) non-temporal stores. That makes the processor avoid writing the data into the cache hierarchy and fetching the corresponding cache lines from the memory into the cache hierarchy, which also allows other important application and library data in the cache hierarchy to remain intact. This routine allows passing large messages faster than when using a standard, generic memory copy routine. If parallel processes share a L2 cache, this routine can be beneficial for message sizes which are comparable with L2 cache size. If the processes do not share a L2 cache, this routine can be beneficial for messages having a size of at least approximately half of L1 cache size, especially for reading from a shared memory queue.

A second memory copy routine may be a SIMD optimized memory copy routine. This routine uses SIMD data movement instructions to move a vector-sized amount of bytes (e.g., 16) at once and may work substantially faster when the user data is aligned on such vector-sized byte boundaries. In one embodiment, this memory copy routine may be beneficial for message with a size of approximately less than half of the L2 cache size, when parallel processes share the L2 cache.

Finally, a third memory copy routine may be a generic copy routine, which uses a data movement instruction with a predetermined prefix which repeats the data movement instruction until a counter register equals zero. In other words this third routine may use microcode of a core for memory copy. In some embodiments, this routine may be beneficial for message with a size less than half of L1 cache size, when parallel processes do not share the L2 cache. While described with these examples, other memory copy routines can be selected that are more optimal for a given design.

Figure 4:
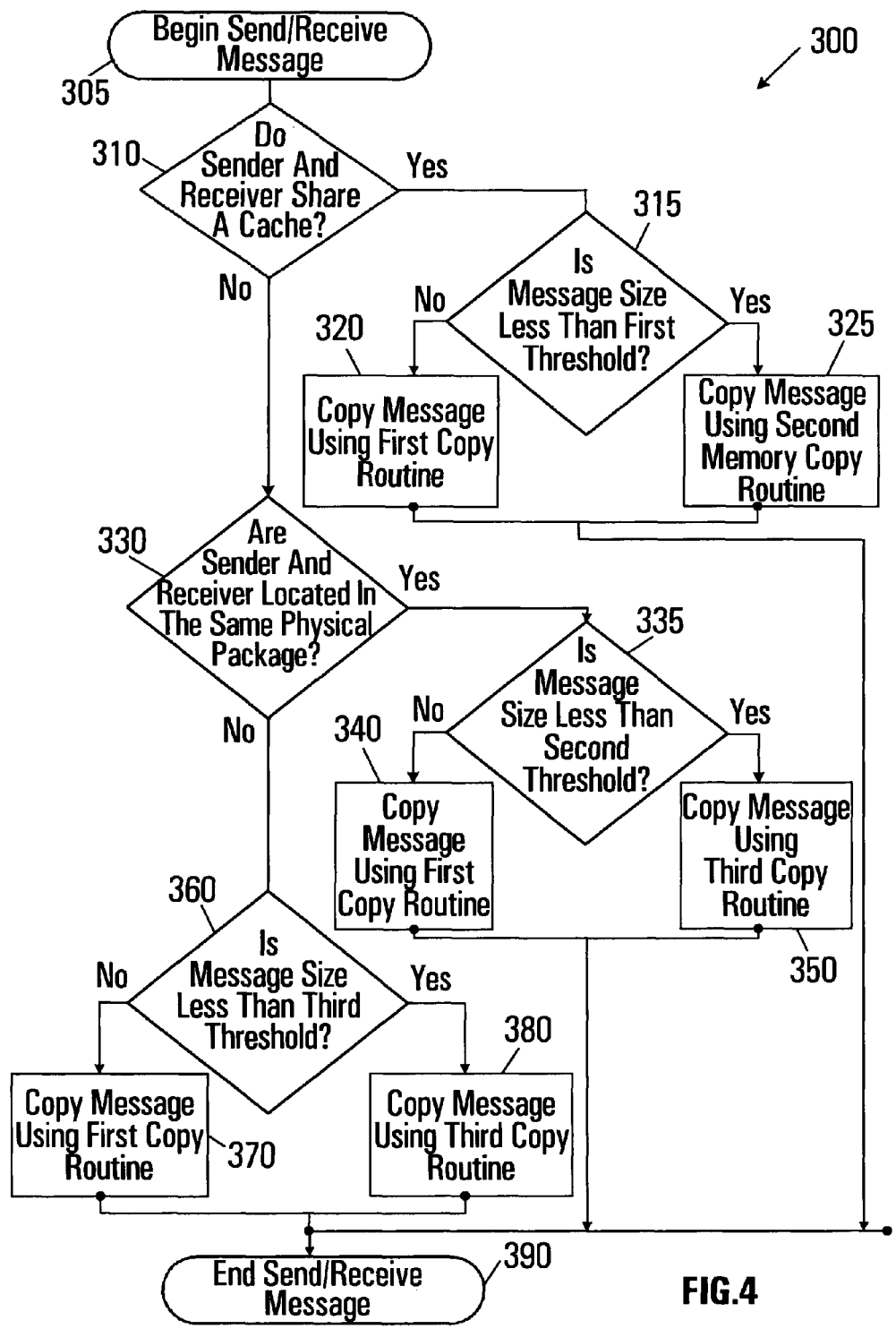
FIG. 4 is a flow diagram of a method in accordance with one embodiment of the present invention.

Referring now to FIG. 4, shown is a flow diagram of a method in accordance with one embodiment of the present invention. As shown in FIG. 4, method 300 may be used to perform message passing between a sending process and a receiving process, which may be parallel processes performed on different cores of one or more multicore processors. Method 300 may begin by initiating a sending/receiving of a message (block 305). As described above, such message transmission may occur using code within a MPI library, although the scope of the present invention is not limited in this regard. For example, in other implementations interprocessor communications may occur according to a different, non-MPI protocol.

Still referring to FIG. 4, next it may be determined whether the sender and receiver share a cache, for example, a L2 cache (diamond 310). In one embodiment, reference to a topological map made be made to make this determination. If the processes share a cache, control passes to diamond 315 where it may be determined whether the message size is less than a first threshold. While the scope of the present invention is not limited in this regard, this first threshold may be a threshold that is used when processes are pinned on cores that share an L2 cache. In one such embodiment, the first threshold may be greater than a maximum size of any possible message for the sender side and a size of approximately half the size of an L2 cache for the receiver side. Based on this determination in diamond 315, control passes to either of blocks 320 and 325, where the message may be copied using a selected one of different copy routines. Note that for the sender side, control may always pass to blocks 325. Specifically, in block 320 a first copy routine, which may correspond to a cache bypass copy routine, may be used if the message size is greater than the first threshold, while at block 325 an optimized SIMD memory copy routine may be used if the message size is less than this threshold. From both of blocks 320 and 325, method 300 concludes at block 390.

If instead the sender and receiver do not share a cache memory, control passes to diamond 330 where it may be determined whether the sender and receiver are in the same (i.e., a single) physical package. If so, control passes to diamond 335, where it may be determined whether the message size is less than a second threshold. In one embodiment, this second threshold may relate to a situation where processes are pinned on cores of a common physical processor package (but do not share an L2 cache). In one embodiment, this second threshold may be greater than the maximum size of any possible message for the sender side and a size of approximately half the size of an L2 cache for the receiver side. Depending on the determined size, the message may be copied using either the first copy routine or a third copy routine as set forth at blocks 340 and 350. For the sender side, message may be always copied using the third copy routine. More specifically, if the message size is greater than the second threshold, the first routine, which may correspond to the cache bypass copy routine, may be performed (block 340). If instead the message size is less than the second threshold, the message may be copied using the third copy routine, which may correspond to a generic copy routine (block 350). Method 300 may then conclude at block 390, discussed above.

If instead the sender and receiver are located in different physical packages, control passes to diamond 360, where it may be determined whether the message size is less than a third threshold. In one embodiment, this third threshold may be approximately half the size of an L1 cache for the sender side, and a size of approximately half the size of an L2 cache for the receiver side. Depending on the determined size, the message may be copied using either the first copy routine or the third copy routine as set forth at blocks 370 and 380. More specifically, if the message size is greater than the third threshold, the first routine, which may correspond to the cache bypass copy routine, may be performed (block 370). If instead the message size is less than the third threshold, the message may be copied using the third copy routine, e.g., a generic copy routine (block 380). Method 300 may then conclude at block 390.

In one embodiment, the determination performed at diamond 310 may be according to the following equation:

$$\mathrm{map}[r_0]\cdot l2 = \mathrm{map}[r_1]l2.$$

Further, the determination made at diamond 330 may be according to the following equation:

$$\mathrm{map}[r_0]\cdot pk = \mathrm{map}[r_1]\cdot pk,$$

where map is an array of structures (i.e., a topological map) with the following members: l2-l2 is an L2 cache identifier; pk is a physical package identifier; $r_0$ is a self-rank identifier; $r_1$ is a rank of another process.

Embodiments may increase MPI library performance over shared memory and mixed transfer modes (i.e., shared memory channel for intranode communications, various network channels for internode communications). For MPI point-to-point operations, performance gains can be up to 100% for small messages (e.g., less than approximately 1 megabytes (Mb)) and up to 50% for large messages. For MPI collective operations, performance gain can be up to 20%. Embodiments may also be used for optimized message passing not only for MPI implementations but for other applications (e.g., systems) which use or implement an inter-process communication mechanism.

Figure 5:
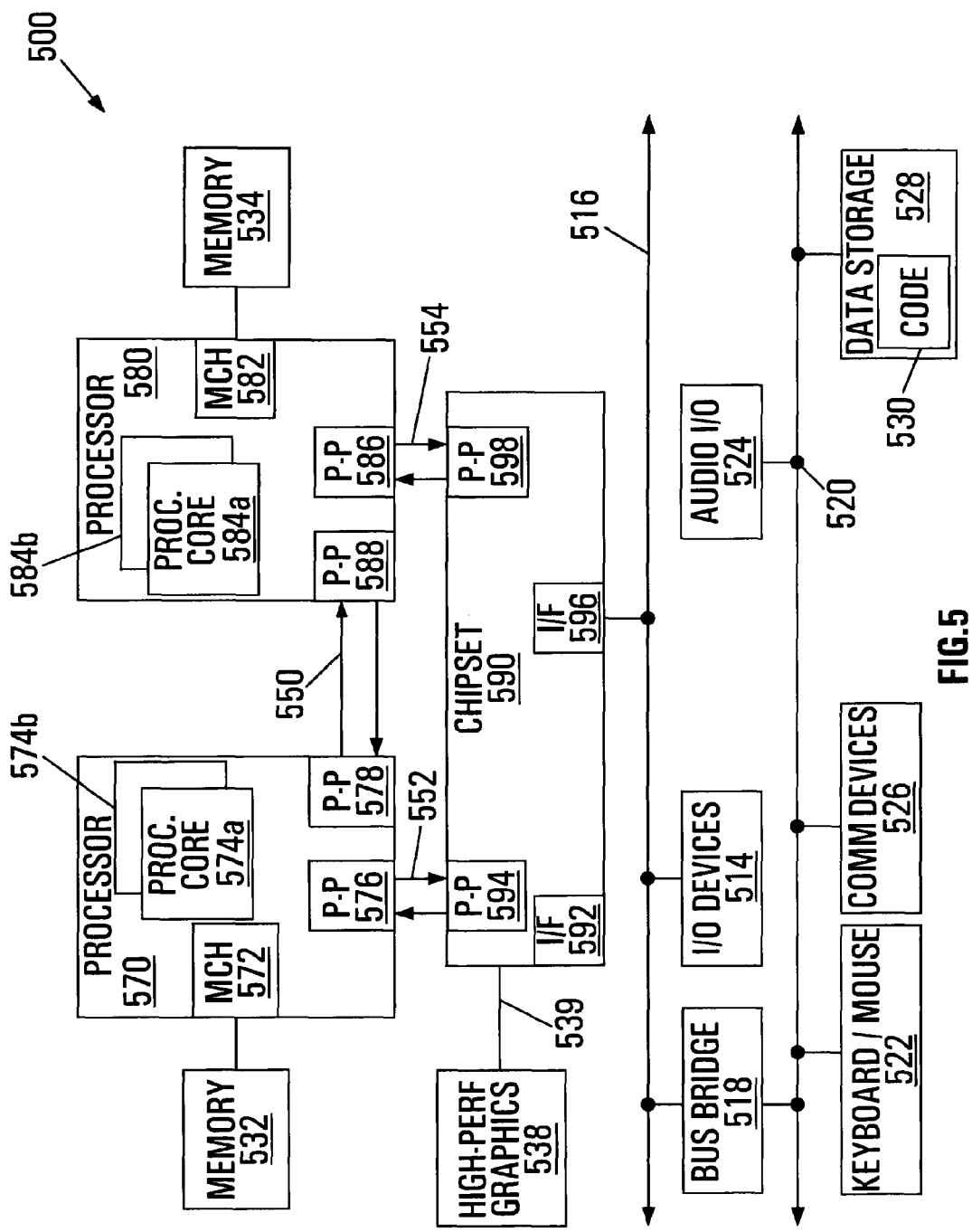
FIG. 5 is a block diagram of a multiprocessor system in which embodiments of the present invention may be implemented.

Embodiments may be suited for many different types of platforms. Referring now to FIG. 5, shown is a block diagram of a multiprocessor system in which embodiments of the present invention may be implemented. As shown in FIG. 5, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 5, each of processors 570 and 580 may be multi-core processors including first and second processor cores (i.e., processor cores 574a and 574b and processor cores 584a and 584b), although other cores and potentially many more other cores may be present in particular embodiments.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538 via a bus 539.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments thus consider architecture specifics of multicore architectures for optimizing of intranode message passing in MPI realization. This approach uses not only the message size, but also multicore topology information about shared resources (e.g., shared L2 cache, front side bus) to select an optimal memory copy routine for passing messages through the shared memory channel. This leads to maximum performance and maximum utilization of capabilities of a multicore architecture.

In some embodiments, an implementation may allow a user to configure different copy routines depending on the multicore topology. For example, a user may be provided with a menu of different available copy routines to use, based on a given topology. The user may also be allowed to choose the threshold for various copy routines, e.g., a non-temporal copy routine, depending on the multicore topology.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining whether a sender of a message to be sent to a receiver using a message passing interface (MPI) shares a cache memory with the receiver and if so, selecting one of a first plurality of memory copy routines to pass the message;
   if the sender and the receiver do not share a cache memory, determining whether the sender and the receiver are located in one processor package and if so, selecting one of a second plurality of memory copy routines to pass the message, wherein the second plurality of routines includes at least one memory copy routine different than copy routines of the first plurality of memory copy routines; and
   if the sender and the receiver are not in the one processor package, selecting one of the second plurality of memory copy routines to pass the message, based on a size of the message.

2. The method of claim 1, further comprising accessing a topological map to determine whether the sender and the receiver share a cache memory and are of the one processor package.

3. The method of claim 1, further comprising selecting the one of the first plurality of memory copy routines based on comparison of a size of the message to a first threshold.

4. The method of claim 3, further comprising selecting a cache bypass copy routine if the message size is greater than the first threshold, and selecting an optimized single instruction multiple data (SIMD) copy routine if the message size is less than the first threshold.

5. The method of claim 4, further comprising selecting the one of the second plurality of memory copy routines based on comparison of the message size to a second threshold.

6. The method of claim 5, further comprising selecting the cache bypass copy routine if the message size is greater than the second threshold, and selecting a third copy routine if the message size is less than the second threshold.

7. An article comprising a machine-accessible medium including instructions that when executed cause a system to:
   obtain topology information regarding the system, wherein the system includes at least one multicore processor, and provide the topology information to a plurality of parallel processes, each of which is to execute on one core of the at least one multicore processor;
   generate a topological map based on the topology information, the topology information including process pinning information and core proximity information; and
   access the topological map to determine a topological relationship between a sender process and a receiver process, and select one of a plurality of memory copy routines to pass a message of a first size from the sender process to the receiver process based on the topological relationship and the first size.

8. The article of claim 7, further comprising instructions that when executed enable the system to select the memory copy routine based on whether the sender process and the receiver process are in a single processor package.

9. The article of claim 8, further comprising instructions that when executed enable the system to select the memory copy routine based on whether the sender process and the receiver process share a cache memory within the single processor package.

10. The article of claim 9, further comprising instructions that when executed enable the system to pin the sender process on a first core of the at least one multicore processor and to pin the receiver process on a second core of the at least one multicore processor.

11. The article of claim 7, further comprising instructions that when executed enable the system to obtain the topology information using a user-level instruction.

12. The article of claim 11, further comprising instructions that when executed enable the system to allow a user to select a set of memory copy routines for usage from a list of memory copy routines.

13. The article of claim 7, further comprising instructions that when executed enable the system to select between a cache bypass copy routine and an optimized single instruction multiple data (SIMD) copy routine based on the first size and whether the sender process and the receiver process share a cache memory of a first multicore processor, and to select between the cache bypass copy routine and a third memory copy routine based on the first size if the sender process and the receiver process are to be executed in the first multicore processor but do not share the cache memory.

14. The article of claim 13, further comprising instructions that when executed enable the system to allow a user to select a level of first and second thresholds used to select the one of the memory copy routines.

15. A system comprising:
a first multicore processor including a first core to execute instructions of a first process and a second core to execute instructions of a second process;
a second multicore processor including a third core to execute instructions of a third process and a fourth core to execute instructions of a fourth process; and
a memory coupled to the first and second multicore processors and including instructions that when executed cause the system to obtain topology information regarding the system, and generate a topological map based on the topology information, the topology information including topological relations between the cores of the multicore processors and at least one cache memory of each of the multicore processors, and select one of a plurality of memory copy routines to pass a message from the first process to one of the second, third, and fourth processes based at least in part on the topology information.

16. The system of claim 15, further comprising instructions that when executed enable the system to select the memory copy routine based on whether the first process and the one of the second, third, and fourth processes are both in the first multicore processor.

17. The system of claim 16, further comprising instructions that when executed enable the system to select the memory copy routine based on whether the first process and the second process share a cache memory within the first multicore processor.

18. The system of claim 15, further comprising a message passing interface (MPI) library including the instructions, wherein the MPI library is to enable the system to obtain the topology information using a user-level instruction.

19. The system of claim 18, wherein the MPI library is to pin the first process on the first core and pin the second process on the second core and to prevent migration of the first process and the second process.

* * * * *